United States Patent
Maxwell, III et al.

(10) Patent No.: US 11,900,018 B2
(45) Date of Patent: Feb. 13, 2024

(54) METHOD FOR GENERATING DESIGNS BASED ON AUTOMATICALLY BUILT DESIGN SPACE GRAMMARS

(71) Applicant: Palo Alto Research Center Incorporated, Palo Alto, CA (US)

(72) Inventors: John T. Maxwell, III, Santa Clara, CA (US); Matthew Klenk, San Francisco, CA (US); Johan de Kleer, Los Altos, CA (US)

(73) Assignee: XEROX CORPORATION, Norwalk, CT (US)

( * ) Notice: Subject to any disclaimer, the term of this patent is extended or adjusted under 35 U.S.C. 154(b) by 1232 days.

(21) Appl. No.: 16/527,668

(22) Filed: Jul. 31, 2019

(65) Prior Publication Data

US 2021/0034710 A1    Feb. 4, 2021

(51) Int. Cl.
G06F 30/00 (2020.01)
G06F 17/11 (2006.01)
G06F 111/20 (2020.01)

(52) U.S. Cl.
CPC .............. G06F 30/00 (2020.01); G06F 17/11 (2013.01); *G06F 2111/20* (2020.01)

(58) Field of Classification Search
CPC .. G06F 2111/20; G06F 30/17; G06F 2111/10; G06F 2111/16; G06F 2111/04; G06F 2113/14; G06F 2113/08; G06F 8/34; G06F 30/373; G06F 30/15; G06F 30/12; G06F 2111/12; G06F 30/00; G06F 17/11; G06F 30/30; G06F 30/20
See application file for complete search history.

(56) References Cited

U.S. PATENT DOCUMENTS

| | | | |
|---|---|---|---|
| 6,370,681 B1* | 4/2002 | Dellarocas | G06F 8/20 717/136 |
| 2015/0193418 A1* | 7/2015 | Koska | H04L 67/10 715/223 |
| 2017/0316126 A1* | 11/2017 | Nicolai | G06F 30/00 |

OTHER PUBLICATIONS

Albarello, Nicolas, and Jean-Baptiste Welcomme. "A model-based method for the generation and optimization of complex systems architectures." 2012 IEEE International Systems Conference SysCon 2012. IEEE, 2012. (Year: 2012).*
Vangheluwe, Hans, Juan De Lara, and Pieter J. Mosterman. "An introduction to multi-paradigm modelling and simulation." Proceedings of the AIS'2002 conference (AI, Simulation and Planning in High Autonomy Systems), Lisboa, Portugal. 2002. (Year: 2002).*

(Continued)

*Primary Examiner* — Eunhee Kim
(74) *Attorney, Agent, or Firm* — Lippes Mathias LLP (57) ABSTRACT

The techniques disclosed herein help designers find interesting designs for small electrical, mechanical, and/or hydraulic mechanisms by exhaustively enumerating the design space given a library of components and a maximum number of components allowed per design. Some embodiments work by creating a design space grammar of designs, solving the equations associated with parts of the grammar, and putting the solutions into equivalence classes. This dramatically reduces the number of designs that have to be evaluated to see if they satisfy the design criteria. The result is often a small number of base designs that show the range of possible solutions to the design problem.

7 Claims, 9 Drawing Sheets

(56) References Cited

OTHER PUBLICATIONS

Siddique, Zahed, and David W. Rosen. "On combinatorial design spaces for the configuration design of product families." AI EDAM 15.2 (2001): 91-108. (Year: 2001).*
Amaresh Chakrabarti, Kristina Shea, Robert Stone, Jonathan Cagan, Matthew Campbell, Noe Vargas Hernandez, and Kristin L Wood. Computer-based design synthesis research: an overview. Journal of Computing and Information Science in Engineering, 11(2):021003, 2011.
Alexander Feldman, Johan de Kleer, and Ion Matei. Design space exploration as quantified satisfaction. arXiv preprint arXiv:1905.02303, 2019.
P. Fritzson. Principles of Object-Oriented Modeling and Simulation with Modelica 2.1. Wiley-IEEE Press, Piscataway, NJ, 2004.
Ashok K Goel, Gongbo Zhang, Bryan Wiltgen, Yuqi Zhang, Swaroop Vattam, and Jeannette Yen. On the benefits of digital libraries of case studies of analogical design: Documentation, access, analysis, and learning. AI EDAM, 29 (2):215-227, 2015.
James B Grimbleby. Automatic analogue circuit synthesis using genetic algorithms. IEE Proceedings-Circuits, Devices and Systems, 147(6):319-323, 2000.
Matthew Klenk, Johan de Kleer, Daniel G Bobrow, Sungwook Yoon, John Hanley, and Bill Janssen. Guiding and verifying early design using qualitative simulation. In ASME 2012 International Design Engineering Technical Conferences and Computers and Information in Engineering Conference, pp. 1097-1103. American Society of Mechanical Engineers, 2012.
Tolga Kurtoglu, Albert Swantner, and Matthew I Campbell. Automating the conceptual design process:"from black box to component selection". AI EDAM, 24(1):49-62, 2010.
Sandeep Neema, Janos Sztipanovits, Gabor Karsai, and Ken Butts. Constraint-based designspace exploration and model synthesis. In EMSOFT, pp. 290-305, 2003.
Robert B Stone and Kristin L Wood. Development of a functional basis for design. Journal of Mechanical design, 122(4):359-370, 2000.
Moshe Y Vardi. From church and prior to psl. In 25 years of model checking, pp. 150-171. Springer, 2008.
EP Search Report in EP Appln. No. 20186823.9-1224; dated Nov. 1, 2021.
Pieter Pauwels et al "Design Space Exploration Using a Shape Grammar Implementation", Jun. 1, 2015; pp. 1-3 XP055756832.
Felix Dobslaw, Input: Genetic and Evolutionary Computation, ACM, NY, NY, Jul. 7, 2012; pp. 149-156 XP058041962.
M. Prats et al."Improving Product Design via a Shape Grammar Tool", International design Conference—Design 2004, May 18, 2004; pp. 1-6 XP055756851.
John T. Maxwell III, et al. "Insane Design of Lumped Element Models", Proceedings of Qualitative Reasoning (QR2019), Sep. 11, 2019, 7 pgs XP055756868.

* cited by examiner

METHOD FOR GENERATING DESIGNS BASED ON AUTOMATICALLY BUILT DESIGN SPACE GRAMMARS

STATEMENT REGARDING FEDERALLY SPONSORED RESEARCH OR DEVELOPMENT

This invention was made with United States Government support under contract HR001118C0041 DARPA-FUNDESIGN-DFOCUS_2 awarded by Defense Advanced Research Projects Agency (DARPA). The United States Government has certain rights in the invention.

BACKGROUND

The following relates to design systems and methods for small electrical, mechanical, and/or hydraulic mechanisms.

Currently, most electrical, mechanical, or hydraulic systems are designed by people using computer-aided design tools. There are some tools for choosing the best parameters for a given conceptual design, but there are few tools for automatically exploring the space of conceptual designs.

The systems and methods described herein address this need and others in the field.

BRIEF DESCRIPTION

The approaches described herein generate designs given a library of design components by first constructing a design space grammar that covers the design space. By itself, this approach would be intractable since the resulting design space grammar is exponential in the number of components that are allowed in each design. The approaches described herein solve this problem by limiting the connectivity of the design space grammar in such a way that the size of the resulting design space grammar is linear in the number of components allowed, even though the number of designs covered by the design space grammar is exponential in the number of components allowed.

The design space grammar can be used to sample designs in the design space and compare them against a design criteria. The disclosed approaches may also include solving the equations associated with each part of the design space grammar and putting the solutions into equivalence classes. Using equivalence classes dramatically reduces the number of designs that need to be evaluated. This allows for evaluation of all of the designs covered by the design space grammar when what is being designed only has a few components (e.g. a nail clipper, a mechanism for moving water uphill).

In one aspect, there is a system including: at least one processor; and at least one memory including computer program code; the at least one memory and the computer program code configured to, with the at least one processor, cause the system to: construct a design space grammar using a library of components by considering all possible ways that each component in the library can connect to an interface; wherein an interface comprises a bounded set of connections that either are configured to connect to a component of the components, or are configured to connect to another interface.

In some embodiments, in the system as described in the previous paragraph: the interface is a primary interface; and the at least one memory and the computer program code are further configured to, with the at least one processor, cause the system to: determine equations associated with a component of the components in the design space grammar; determine equations associated with each equivalence class of a dependent interface of the component; and solve equations associated with the design space grammar by: (i) combining the equations associated with a component with the equations associated with each equivalence class of the dependent interface of the component; (ii) simplifying the combined equations; and (iii) putting the simplified, combined equations into an equivalence class of the primary interface. The bound on the bounded set of connections can be specified by the user of the system. The interface may further comprise a number of components that implement the interface.

In another aspect, there is a method, including: with one or more processors: building a design space grammar using a component model library, and a design scenario; and using the design space grammar to build designs; wherein the design space grammar comprises an interface, and components from the model library; and wherein the design space grammar is built by generating a collection of rules for the interface by iterating over: (i) connections of the interface, and (ii) components of the model library.

In some embodiments, the method as described in the previous paragraph may further include, with the one or more processors: subsequent to the iteration, recursively connecting remaining connections by attaching a connection to a first empty connection of the correct type in the interface. The interface may be a primary interface, and the method may further include, with the one or more processors: determining that there is an empty connection in the primary interface; and adding the empty connection to a dependent interface. In some embodiments, the types of connections comprise: (i) electrical connections, (ii) mechanical connections, and (iii) hydraulic connections. In some embodiments, the interface is a primary interface, and the method further comprises, with the one or more processors: subsequent to the iteration, recursively connecting remaining connections by attaching a connection to a dependent interface. In some embodiments, the method further includes, with the one or more processors: subsequent to the iteration, recursively connecting remaining connections including skipping a connection marked as optional. In some embodiments, the method further includes, with the one or more processors: subsequent to the iteration, recursively connecting remaining connections by, for a sharable connection, both: (i) attaching the sharable connection to a first empty connection, and (ii) attaching the sharable connection to the dependent interface. In some embodiments, the collection of rules is a design family, and each rule of the collection of rules is a design alternative; and the building of the designs comprises making paths though the design family and design alternatives. In some embodiments, the method further includes, with the one or more processors, imposing a bound on a number of connections (m) that an interface can have. In some embodiments, the designs include a design with a conceptual water tank, and the method further includes a human user placing a physical water tank in a location based on an indication of the design with the conceptual water tank. In some embodiments, the method further includes, with the one or more processors, building a design according to: (i) the design space grammar, and (ii) a maximum number of components (n) allowed in a design. In some embodiments, the method further includes, with the one or more processors, building a design according to: (i) the design space grammar, and (ii) a maximum number of state variables allowed in a design.

In yet another aspect, there is a system comprising one or more processors configured to: build a design space grammar using a component model library, and a design scenario, wherein the design space grammar comprises a collection of design families that are used to implement the design scenario, and wherein each design family comprises at least one rule corresponding to a design alternative; wherein the collection of design families includes: (i) at least one design family with only one component, and (ii) at least one design family with more than one component; and wherein the one or more processors are further configured to: for each design family with only one component, enumerate each design alternative associated with the family, extract equations of each design alternative associated with the family, put the equations in standard form, and simplify coefficients of the equations; and group the equations into equivalence classes, and associate the equivalence classes with the design family.

In a system as described in the preceding paragraph, in some embodiments, the one or more processors are further configured to: for each design family with two components, enumerate each design alternative associated with the family with two components; for each design alternative associated with the family with two components, enumerate equivalence classes of a dependent design family; for each equivalence class of the dependent design family, combine equations of the equivalence class of the dependent design family with equations for the design alternative associated with the family with two components, and simplify a result of the combination; and group the simplified result into second equivalence classes, and associate the second equivalence classes with the design family with two components.

In some embodiments, the one or more processors are further configured to: using the equivalence classes, identify potential base designs; delete a component from a potential base design of the potential base designs; and if the potential base design with the component deleted still satisfies the design scenario, discard, as spurious, the potential base design without the component deleted.

One advantage resides in a novel method for constructing a design space grammar given a library of components such that the size of the resulting design space grammar is linear in the number of components allowed in a design.

Another advantage is a novel method for solving the equations associated with a design space grammar by creating equivalence classes so that the number of designs that need to be evaluated is dramatically reduced.

Yet another advantage is performance. In some embodiments, an exponential number of candidate designs can be processed in linear time.

DETAILED DESCRIPTION

The approaches disclosed herein help designers find interesting designs for small electrical, mechanical, and/or hydraulic mechanisms by exhaustively enumerating the design space given a library of components and a maximum number of components allowed per design. The approaches work by creating a design space grammar of conceptual designs, solving the equations associated with parts of the grammar, and putting the solutions into equivalence classes. This dramatically reduces the number of designs that have to be evaluated to see if they satisfy the design criteria. The result is often a small number of base designs that show the range of possible solutions to the design problem.

The design process is the task of generating abstract solutions to a design problem. Herein it is shown that exhaustive enumeration and evaluation of the designs in a design space (e.g., insane design) can be made practical for small designs using qualitative reasoning. It is also shown that it is possible to detect when all of the behaviorally distinct designs in a given design space have been found, and further shown that under certain conditions the time that it takes to find all possible designs grows linearly in the number of components allowed in a design.

In the design process, designers explore not only the space of possible solutions but also requirements. This is an ideal problem for qualitative reasoning, which enables analysis of potential designs with under-specified parameters and requirements. In previous work, it has been shown how search over component topologies combined with qualitative simulation (sometimes referred to as envisionment) enables the identification of designs that may yield promising solutions [Klenk et al., Guiding and verifying early design using qualitative simulation; *ASME* 2012 *International Design Engineering Technical Conferences and Computers and Information in Engineering Conference*, pages 1097-1103. American Society of Mechanical Engineers; 2012].

The approaches disclosed herein address the following two challenges that must be overcome in next generation design tools. First, how to represent an exponential set of designs. Second, how to efficiently evaluate these designs.

Some contributions of this disclosure include the following. First, an automated process for constructing design space grammars. Second, a formal analysis of the size of this design space grammar in terms of the number of components and number of interconnections. Third, a new method for identifying behaviorally equivalent designs and terminating search when all behaviorally equivalent designs have been found. Finally, a case study applied to a design problem of moving water uphill.

The remainder of this disclosure is organized generally as follows. First, a system described herein (e.g. the insane designer) is outlined. Next, the disclosure introduces design space grammars and describes aspects of automatically constructing them from a component model library and design scenario. This is followed by sections describing behavioral equivalence classes and how they are identified. Next, the formal analyses is complimented with a case study of designing systems to move water uphill. Finally, there is a discussion of related work and open questions.

Figure 1:
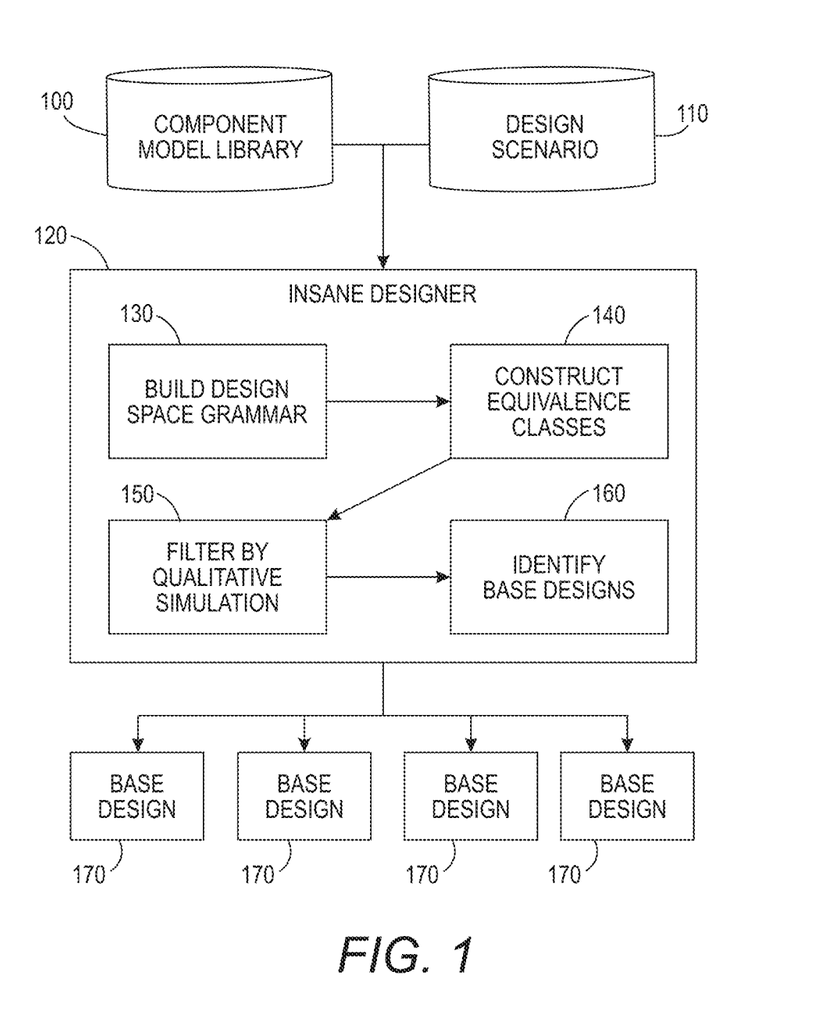
FIG. 1 provides an overview of an example system as described herein.

This disclosure refers to the process of exploring all possible designs as "insane design." With reference to FIG. 1, Insane Designer 120 takes a component model library 100 and a design scenario 110 as input and returns all minimal base designs 170 that satisfy that design scenario 110. In some embodiments, this occurs by the operations of: build design space grammar 130; construct equivalence classes 140; filter by qualitative simulation 150 and identify base designs 160.

Of interest is generating all possible base designs 170 up to a given number of components that satisfy a given design scenario 110. The design scenario 110 is a set of components and connections with an interface to a design along with requirements specified as equations on qualitative values of the components. (cf FIG. 2).

Figure 2:
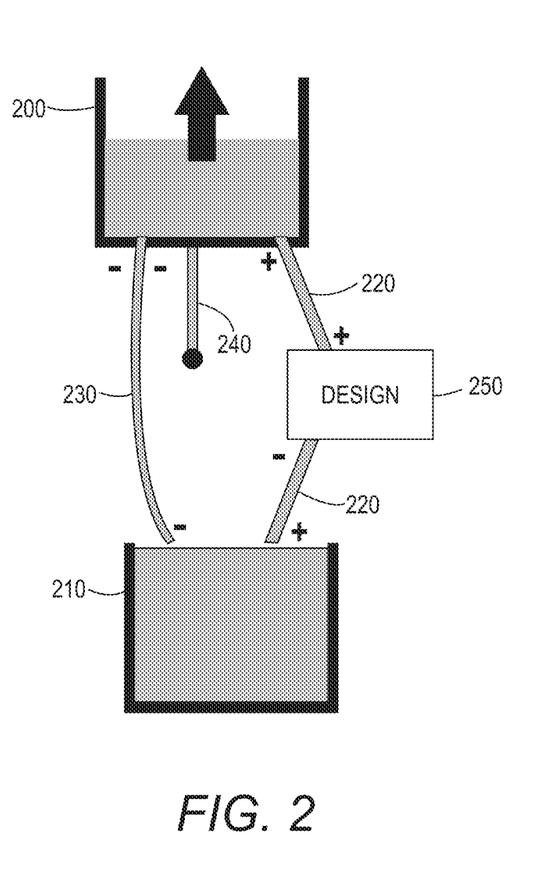
FIG. 2 illustrates an example of a design scenario to move water uphill.

FIG. 2 illustrates a sample design scenario to move water uphill. In this sample design scenario, two tanks 200, 210 are connected to an interface 250. The pressure of one of the tanks 200 is less than the other 210, and the requirement is that water must flow into the lower pressure tank 200.

Figure 3:
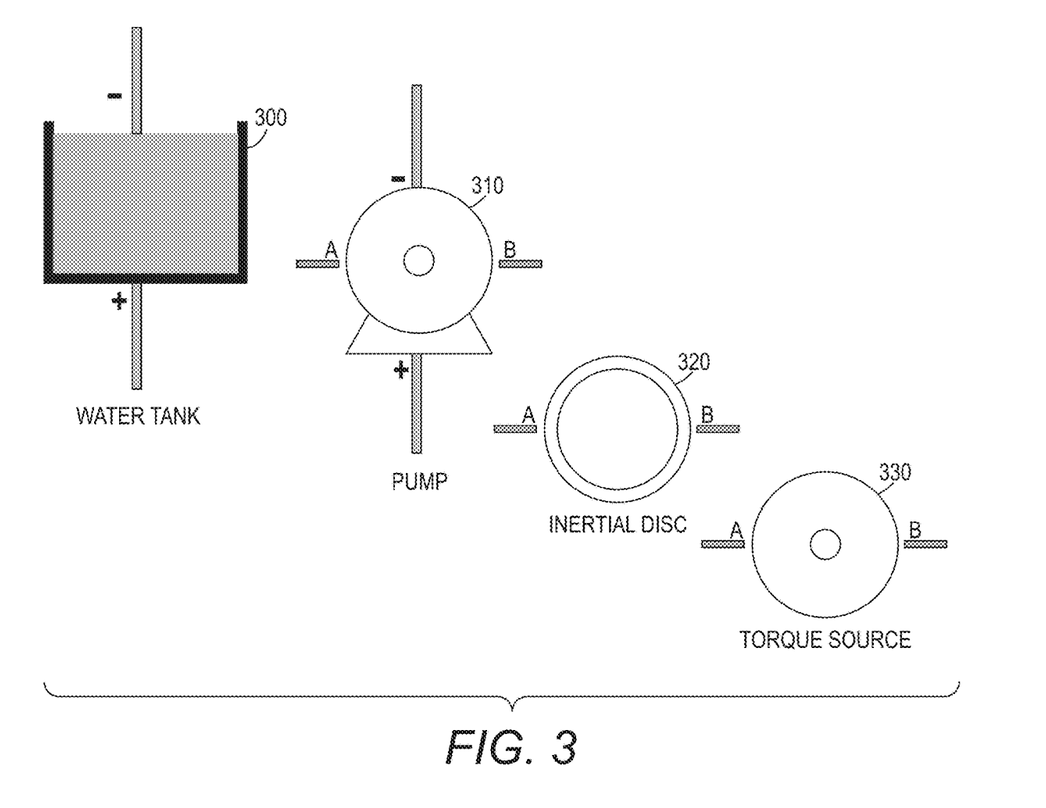
FIG. 3 illustrates an example scenario with a small library of components.

Along with the scenario, consider a library of components that can be used to create designs. The components in the library can include resistors, capacitors, and batteries (for the electrical domain); pipes and tanks (for the fluid domain); torque sources and inertial discs (for the rotational domain); and pumps and motors (for cross-domain designs) (cf FIG. 3). The components have both topological information (e.g., typed connections that determine how components can be connected together) and behavioral information (e.g., differential and algebraic equations that link the connections within a component). The goal is to find designs made up of components from the library that are connected according to their typed connections which satisfy the scenario goals when the designs are substituted for the placeholder in the design scenario.

To make exhaustive enumeration practical, some embodiments first create a design space grammar. The design space grammar is a context-free grammar that describes the space of possible designs. Every design that the design space grammar describes is a topologically valid design (e.g., connections between components have the right type, and there are no dangling connections not connected to another component or interface).

When designs are enumerated in the design space grammar for evaluation, designs are often encountered that are equivalent from a behavioral point of view. For instance, a capacitor and a resistor in series has the same behavior as a resistor and a capacitor in series in a lumped element model. In another example, two resistors in series have the same qualitative behavior as one resistor (the two resistors can be replaced with one resistor whose resistance is the sum of the two resistors). Since it is expensive to apply qualitative reasoning to a design to determine whether it satisfies the scenario's goals, it is worthwhile to group equivalent designs into equivalence classes.

Qualitative simulation (e.g. qualitative reasoning) is performed on the simplest design in each equivalence class in order to determine whether it satisfies the scenario. (As is understood in the art, qualitative simulation produces non-numerical descriptions of physical systems and/or the behavior of the physical systems. For example, for two resistors in an electrical circuit, a qualitative simulation may consider $VR1 > VR2$ rather than consider specific numerical voltage values for each of the two resistor voltages.) If the simplest design satisfies the scenario, then all of the designs in the equivalence class also satisfy the scenario. Designs can be enumerated in such equivalence classes to obtain all of the designs that satisfy the scenario. Some of these designs will be trivial variations of other designs. For instance, one design might add a spurious component to another design that satisfies the scenario. This is detected by deleting components one at a time from a successful design to see whether the design still satisfies the scenario. If it does, then the design (without the component(s) deleted) is discarded as spurious. If there is no deletion that produces a design that satisfies the scenario, then this design is designated as a base design. The output of the insane designer 120 is the set of all base designs that satisfy the scenario 110.

This disclosure analyzes how the performance of the insane design algorithm scales with the number of components allowed in a design. Doing this analysis shows that exhaustive enumeration is impractical except for trivially small design spaces because the search space becomes very large as the number of components increases. To make exhaustive enumeration practical, a limit must be placed on the search space. One goal is to limit the search space in such a way that the resulting designs are useful and that the designer understands the implications of the limitations. A limit is placed on the design space by letting the user specify an upper bound on how interconnected the design can be and an upper bound on how many state variables are allowed in a design. These limitations will be explained in later sections.

Designs may be enumerated by the number of components they contain. So, first all one component designs are enumerated, then all two component designs, and so on. Some embodiments build on the designs already done in previous iterations, so that three component designs are built on the two component designs that have already been found. This disclosure shows that it is possible to detect when there are no more qualitatively distinct designs to be found, allowing some embodiments to stop enumerating designs (further designs may be interesting for non-qualitative reasons). If the enumeration is continued, the amount of work needed is linear in the number of components that are added because the number of distinct equivalence classes for each new component remain the same.

The following will describe design space grammar. A design space grammar has interfaces between sets of components and terminals that are components from the component model library 100. Each interface is defined by a set of connections and the number of components that its implementation ultimately contains. In some embodiments, there are two types of rules in the design space grammar: (1) interface (N)→component interface (N−1), where N is the number of components of the interface to the left of the arrow, and (2) interface (1)→component. The interface to the left of the arrow is referred to as the primary interface, and the interface to the right of the arrow is referred to as the dependent interface. The rules also include information about how the interfaces are connected to the component and to each other. Some embodiments allow only well-formed rules (e.g. rules where all of the connections have the right type and there are no empty connections). In some embodiments, the interface is only defined by a set of connections, which means that the design space grammar can have cycles in it. The presence of cycles makes any algorithms that process the design space grammar slightly more complicated than described below, but they can be handled using standard techniques.

Even though some embodiments only allow one component and one dependent interface per rule, it is possible to create complex design topologies with branches in them (e.g., designs where one component is connected to three or more other components) because there can be connections between the two interfaces that bypass the rule's component. Allowing for more than one dependent interface per rule is possible, but it would have made the exposition of the ideas in this disclosure more complicated.

Figure 4:
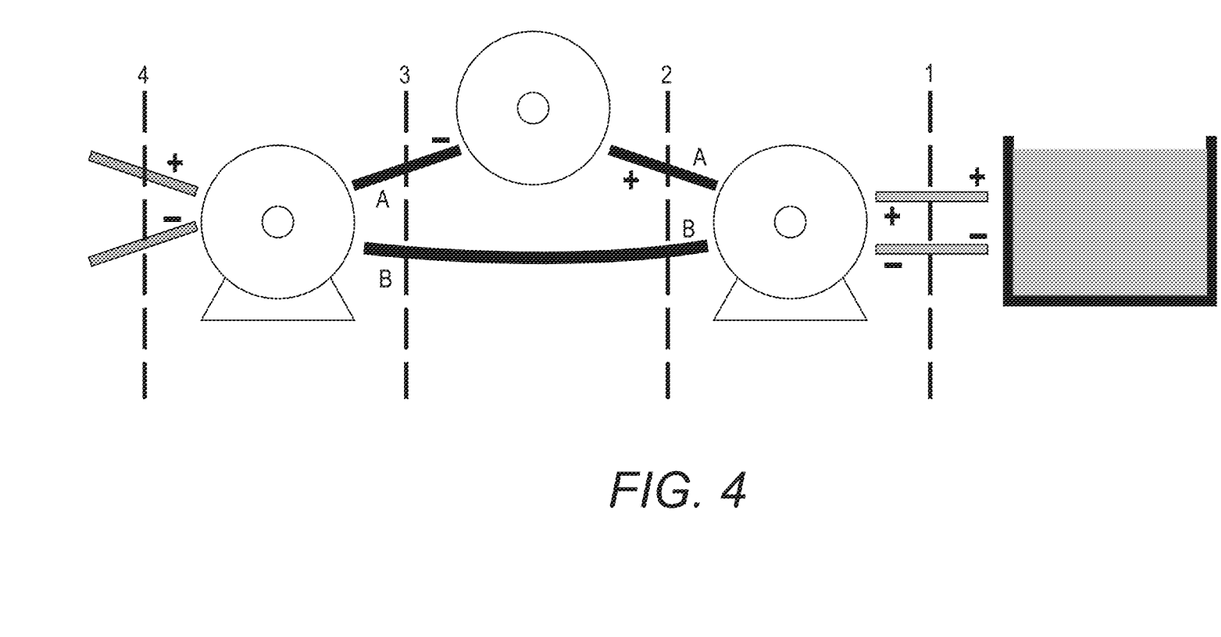
FIG. 4 shows an example component sequence with design interfaces.

To understand how a design space grammar works, imagine one took a design and laid it out as a sequence of components with the external connections at the left (cf FIG. 4).

Between each pair of components there is a vertical dotted line that represents an interface. The number above the dotted line (1, 2, 3, or 4) is the number of components to the right of the interface. The interface also contains a set of connections between components. The area between a pair of interfaces implicitly defines a rule that consists of a component and a set of connections between the component and the interfaces and between the two interfaces.

There may be more than one way to implement an interface using a component. All of the rules for a particular interface may be generated by iterating over the components in the library. For each component, some embodiments first iterate over the connections and produce a class of rules for each connection by connecting the connection to the first empty connection in the primary interface of the correct type, if such a connection exists. Some embodiments then recursively connect the remaining connections in the component. For each connection, some embodiments allow, without limitation, the following options: (1) attach the connection to the first empty connection in the primary interface of the correct type, (2) to add the connection to the dependent interface, (3) skip the connection if it is marked as optional, and (4) simultaneously attach the connection to the first empty connection in the primary interface AND attach the connection to the dependent interface if the connection is marked as sharable on the component (e.g. pins on an integrated circuit are marked as sharable). In this regard, if more than one dependent interface is allowed (as mentioned above), it must be selected which dependent interface to attach to. In option (4), some embodiments choose more than one dependent interface. If there are any empty connections in the primary interface, they are added to the dependent interface. When finished, some embodiments create a dependent interface with a component count of N−1, where N is the number of components in the primary interface.

Figure 5:
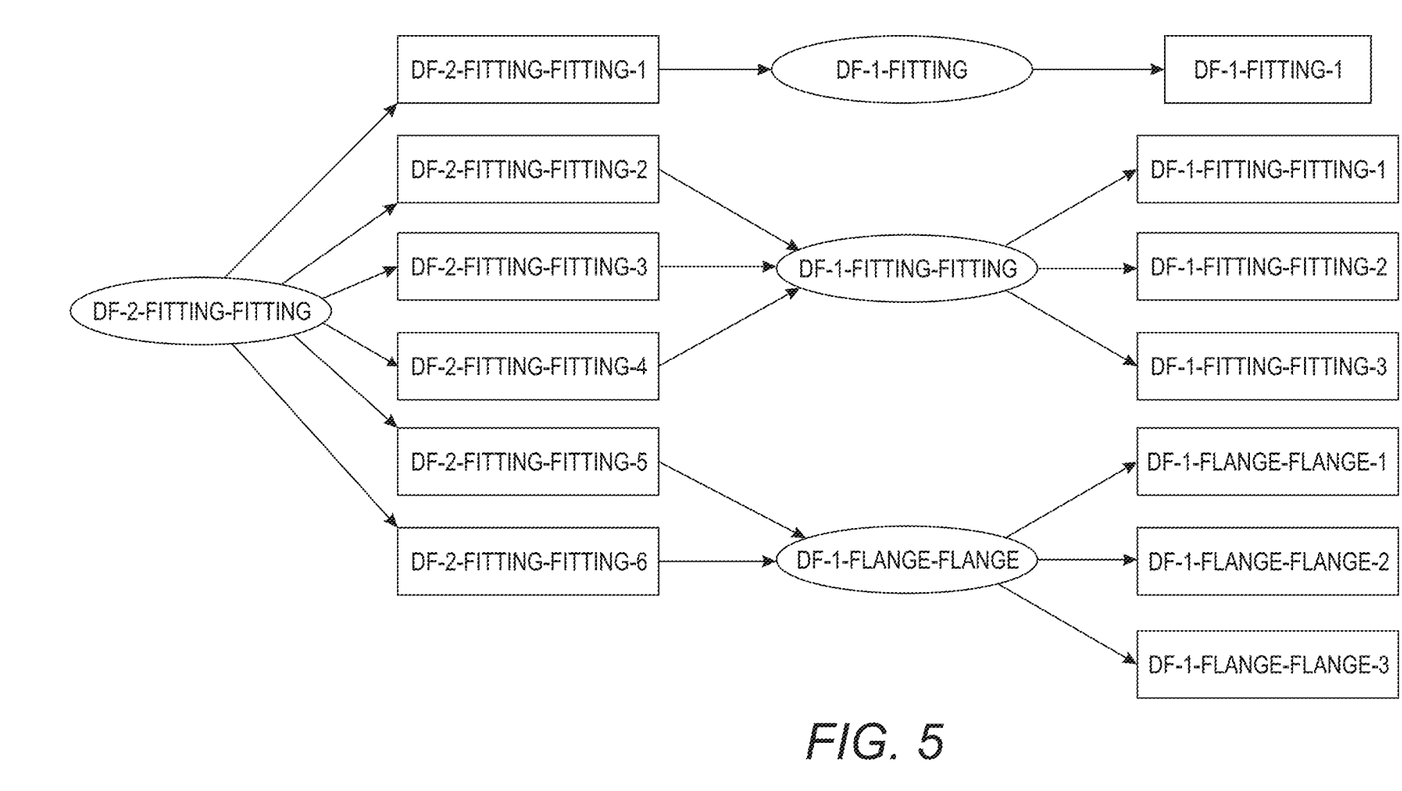
FIG. 5 shows the design families of a two-component design space grammar along with their design alternatives and dependent design families.

The collection of rules that implements a primary interface is referred to as a design family, and each rule in a design family is referred to as a design alternative. A design space grammar is the collection of design families that are needed to implement the interface specified by a scenario. FIG. 5 shows the design families of a two-component design space grammar along with their design alternatives and dependent design families (the components and their connections are not shown). The design families are oval, the design alternatives are rectangular. The DF-1 design families are dependent interfaces of the DF-2 design alternatives.

FIG. 5 shows a graph of four design families (ovals) in a design space grammar specifying all two component designs. This grammar captures 19 designs. Each design is a different path through the tree. There is one path to the top leaf, 3 paths to each of the next three leaves, and 2 paths to the last three leaves (1×1)+(3×3)+(2×3)=19.

The following will describe an analysis of design space grammar size. The size of a design space grammar is a function of the number of design families and the number of design alternatives per design family. The number of design families in a design space grammar depends on the number of interfaces possible. The number of interfaces depends on the maximum number of components that are allowed in our designs and the number of different sets of connections possible. The number of connections is a function of the maximum number of components allowed in a design, which is n. To see this, note that each component in a rule could add at most m−1 connections when moving from the primary interface to the dependent interface, where m is the maximum number of connections of any component in the library. This means there could be mn connections in the worst case. Because m is fixed for a given component library, there are at most $O(n)$ connections in an interface.

If there were only one kind of connection, then there would be $O(n)$ sets of connections, one set for each possible number of connections (order does not matter). If there were two kinds of connections (e.g., fluid and rotational mechanics), then of concern would be about how many there were of each. Order does not matter, but there could potentially be 0, 1, 2, 3, ..., n different connections of each type. So then there are $O(n^2)$ different sets of connections. In general, if there are k different kinds of connections, there can be $O(n^k)$ different sets of connections in the worst case. So, there can be at most $O(n^{k+1})$ different interfaces if the different component counts that an interface can have are included. The number of design alternatives per design family is a function of the number of components in the library and the maximum number of connections per component, but it is not a function of n. Therefore, the size of the design space grammar is $O(n^{k+1})$ in the worst case.

It can be seen that as the number of components in a design grows, the size of the design space grammar grows very quickly, especially with cross-domain designs. To make design generation practical, some embodiments impose a bound on the number of connections that an interface can have. This corresponds to a limitation on how connected a design is overall. Limiting the number of connections makes the designs more modular.

Consider if the maximum number of connections allowed is c. Then the number of different sets of connections is a function of c, but it is no longer a function of n. Therefore, the size of the design space grammar is $O(n)$ in the worst case.

The following will address design equivalence. Two designs are equivalent if they exhibit the same behavior at their interfaces. The following considers only linear systems and therefore there are only four types of equations. The first type arises primarily from definitions and conservation laws ($v_i$ are the variables of the system):

$$\Sigma_i v_i = 0.$$

Examples of such equations arise from Kirchoff's voltage and current laws.

The second type arises from constitutive laws:

$$v_i = K_{ij} v_j.$$

An example of such an equation is Ohm's law: $v=Ri$.
The third type arises from state variables:

$$v_i = D_{ij} \dot{v}_j.$$

An example of such an equation describes the behavior of a capacitor:

$$i = C\dot{v}.$$

The fourth type arises from inputs:

$$v = 1.5.$$

For example, the battery supplies 1.5 volts.
From systems theory it is known that every system can be described by:

$$\dot{x} = Ax + Bu(t) \qquad (1)$$

x are the state variables and the matrices A and B will be unique up to permutation. Unfortunately, in one approach, a design is not a complete system because of the external connections and cannot be described in this way. For example, a design consisting only of a resistor has three external variables $i_1$, $i_2$ and v. The current through the resistor will be determined by how it is connected to other designs. A design may have fewer equations than unknowns. It is only a fragment of a system; only a complete system with many composed designs can be characterized by Equation (1). In order to reduce the search space, it may be desirable to detect duplicate designs as soon as possible. These designs may have different component connection topologies and may have different numbers of components. Although there are extensive types analyses from systems theory, here some embodiments apply a simplified approach which provides a significant computational advantage. It is computationally too expensive to detect all equivalent designs according to systems theory.

Some embodiments attempt to rewrite the equations into an equivalent set referring only to interface and state variables. From the original set of equations, some embodiments use Guassian elimination to remove all the internal non-state variables.

If (2) below is a set of equations with external variables $P_{11}$ and $P_{13}$, positive constants $c_2$ and $c_4$, and state variable $P_{15}$, then Equation (3) below is its simplified equivalent in standard form.

$$Q_2 = d/dt(c_4 P_{15})$$

$$P_9 = -c_2 Q_2$$

$$P_{15} = P_1 - P_{13}$$

$$P_9 + P_{11} = P_1 \quad (2)$$

$$P_{15} = P_{13} - P_{11} - d/dt(c_{18} P_{15}) \quad (3)$$

The analysis can sometimes determine a set of equations is inconsistent. Some embodiments discard designs which have inconsistent equations. For instance, the equation $c_i = -c_j$ is inconsistent if $c_i$ and $c_j$ are constant parameters that are known to be positive.

In most cases, the equations can be simplified to the form shown in Equation 4 below ($V_i$ are only the interface and state variables):

$$C_i + \Sigma_j D_{ij} V_j + \Sigma_j E_{ij} \dot{V}_j = 0. \quad (4)$$

Where all the coefficients $C_i$, $D_{ij}$, $E_{ij}$ can be algebraic functions of the parameters of the design. In matrix form, $C + DV + E\dot{V} = 0$.

(This is a generalization of Generalized Thevenin form.) Given a lexographic order, some embodiments reduce these equations to a canonical form. A design with a set of equations equivalent to those of another modulo permutation of the ordering is equivalent. This approach greatly reduces the space explored.

The following will describe an analysis of the number of distinct designs. The number of distinct designs is a function of the number of equations per design and the number of different equations that are possible. The number of equations per design is a function of the number of distinct variables used by the design, which is the number of external variables plus the number of state variables. The number of external variables is not a function of n since the number of connections is bounded, but the number of state variables can be a function of n since each component could introduce one or more state variables. Therefore, some embodiments let the user specify a maximum number of state variables allowed in a design. This means that the number of distinct variables is no longer a function of n.

Since the total number of variables allowed is bounded in the insane designer 120, the number of equations in the standard form is bounded (there is at most one equation per variable). So, the number of equations per design is not a function of n, and the number of variables per equation is not a function of n.

Unfortunately, the number of different coefficients for each variable is a function of n since each coefficient can be an arbitrary algebraic expression of the O(n) component parameters in the design. If it were possible to always simplify the coefficients to a single parameter, then the number of distinct equations possible would be bounded and there would only be a finite number of distinct designs, independent of the number of components that a design could have. This would only be true because a limit had been set on the number of state variables and the number of connections per interface.

The following will discuss finding equivalence classes. The design scenario does not impose any conditions on the form of the design other than its external connections and the maximum number of components that it can have. Therefore, it is not needed for the design itself to do evaluation, just the equations that describe its behavior. Some embodiments use the design space grammar to efficiently enumerate all of the distinct sets of equations if the embodiments take design equivalence into account.

Some embodiments create equivalence classes for the design families bottom up. In one aspect, this begins with design families that only have one component. For each design family, some embodiments enumerate each design alternative associated with the family, extract its equations, put the equations in standard form and simplify their coefficients. When this is done for all of the design alternatives in a design family, some embodiments group the equations into equivalence classes, and associate the equivalence classes with the design family.

Next, some embodiments process design families that have two components. For each design family, some embodiments enumerate each design alternative associated with the family. For each design alternative, some embodiments enumerate the equivalence classes of its dependent design family. For each equivalence class, some embodiments combine the equations for the equivalence class with the equations for the design alternative and standardize and simplify the result. When this is done for all of the design alternatives, some embodiments group the sets of equations into equivalence classes, and associate the equivalence classes with the design family.

Some embodiments continue this process for each number of components until the maximum number of components specified by the user is reached. Some embodiments then run the qualitative reasoner on the smallest design in each equivalence class and determine whether the scenario goals are satisfied. Some embodiments discard any equivalence classes that do not satisfy the scenario goals.

All of the designs can now be enumerated that satisfy the scenario by starting with an equivalence class that satisfies the scenario goals and recursively choosing one design alternative from each dependent equivalence class. Each resulting design is syntactically well-formed and satisfies the scenario goals.

The following will discuss early termination of search. As described above, some embodiments stop creating equivalence classes when they reach design families that have the maximum number of components specified by the user. Sometimes, though, it can be detected that no more distinct designs are possible, and creation of equivalence classes can then be stopped early.

Some embodiments detect that no more distinct designs are possible when the number of equivalence classes for each design family at a particular number of components are the same as the number of equivalence classes for the corresponding design family at the previous number of components. For instance, Table 1 below shows the number of equivalence classes for a very simple design problem that only has four interfaces: Int1, Int2, Int3, and Int4. Each cell corresponds to a design family where the row indicates the interface and the column the number of components to the right of the interface. Notice that starting at 12 components, the number of equivalence classes for each design family is the same as the number of equivalence classes for the corresponding design family at the previous number of components.

TABLE 1

|      | 7  | 8  | 9  | 10 | 11 | 12 | 13 | 14 |
|------|----|----|----|----|----|----|----|----|
| Int1 | 4  | 4  | 4  | 4  | 4  | 4  | 4  | 4  |
| Int2 | 2  | 2  | 2  | 2  | 2  | 2  | 2  | 2  |
| Int3 | 43 | 49 | 51 | 51 | 51 | 51 | 51 | 51 |
| Int4 | 22 | 24 | 26 | 28 | 30 | 30 | 30 | 30 |

Table 1 shows the number of equivalence classes per design family. For embodiments only interested in behaviorally distinct designs, there is no point in continuing to create equivalence classes after 12 components. One reason, however, for continuing to create equivalence classes is that there might be new designs that are behaviorally the same as the designs found so far, but which have other interesting properties based on the topology of their components. If creation of equivalence classes is continued, the amount of additional work done will be linear in the number of components because it only depends on the equivalence classes at the previous step.

The following will describe a case study in moving water uphill.

To demonstrate the importance of equivalence classes, the following presents an example case study of applying the insane designer to the problem of moving water uphill. The example scenario (FIG. 2) includes and a small library of components: water tank 300, pump 310, inertial disc 320, and torque source 330 (cf FIG. 3) plus pipes 220, 230, and a fluid ground 240. Some embodiments generate all possible designs from 4 components up to 7 components. This example includes a limit on the designs to a single state variable and three connections per interface.

TABLE 2

| components | designs | classes | time (s) |
|------------|---------|---------|----------|
| 4          | 462     | 29      | 1        |
| 5          | 2255    | 60      | 2        |
| 6          | 11601   | 87      | 6        |
| 7          | 64576   | 144     | 21       |

Table 2 shows performance of the systems and methods described herein (e.g. performance of insane designer 120) with increasing components. In this regard, Table 2 shows how the insane designer 120 performs as the number of components increases (qualitative reasoning time is excluded). Note that while the number of designs is clearly exponential, the number of equivalence classes is almost linear.

In this regard, Table 2 illustrates that the systems and methods described herein advantageously improve technical functioning of the system. For example, as the number of designs increases from 462 to 64576, the run time increases only from 1 to 21 seconds on a MAC PRO with a 3.5 GHz 6-Core INTEL XEON E5. The same computation without equivalence classes would have taken ~2 hours to find all possible 7 component designs on the same machine. Thus, the technical functioning of any processor(s) operating with the systems and methods described herein is improved at least because of this improved run time.

In the four component design, the design space grammar has 16 design families and 54 design alternatives. This design space grammar is a packed representation of 462 different possible designs with only 29 equivalence classes of designs. The process so far takes less than a second. The qualitative reasoner then evaluates the simplest design from each of the 29 equivalence classes and determines that 16 of them satisfy the scenario. This takes 55 seconds. It then enumerates 292 designs that satisfy the scenario from the 16 equivalence classes. Of the 292 designs, there are only 9 distinct base designs, four of which are shown in FIGS. 6A-6D.

Figure 6A:
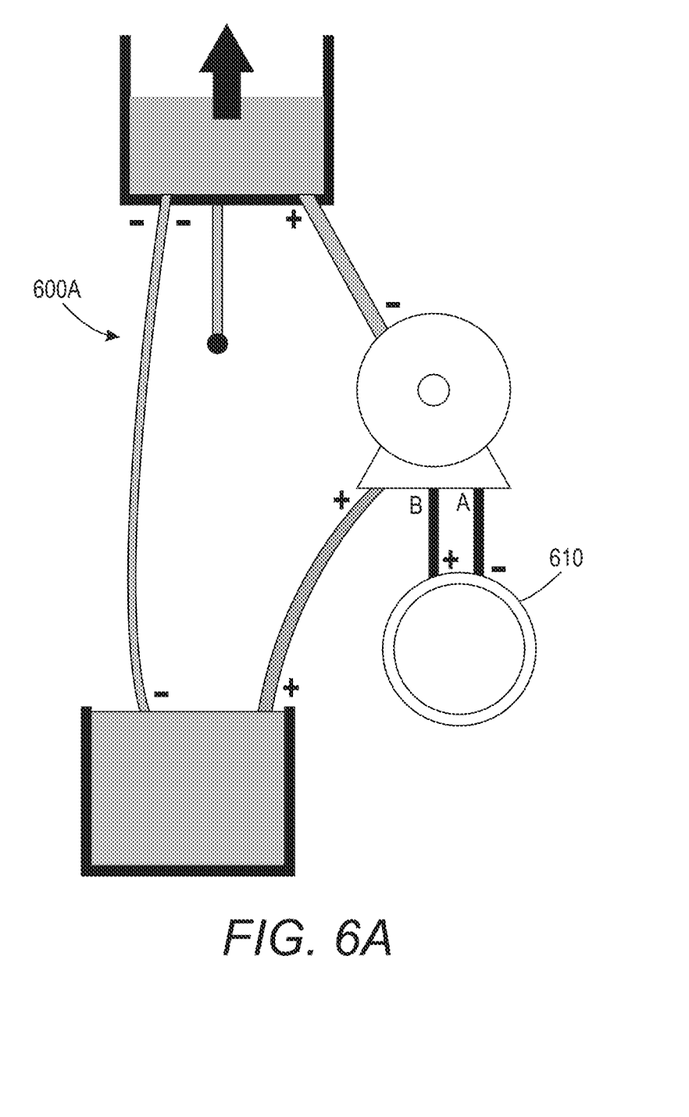
FIGS. 6A-6D show some example base designs created by the systems and methods described herein for the scenario of FIG. 2.
Figure 6B:
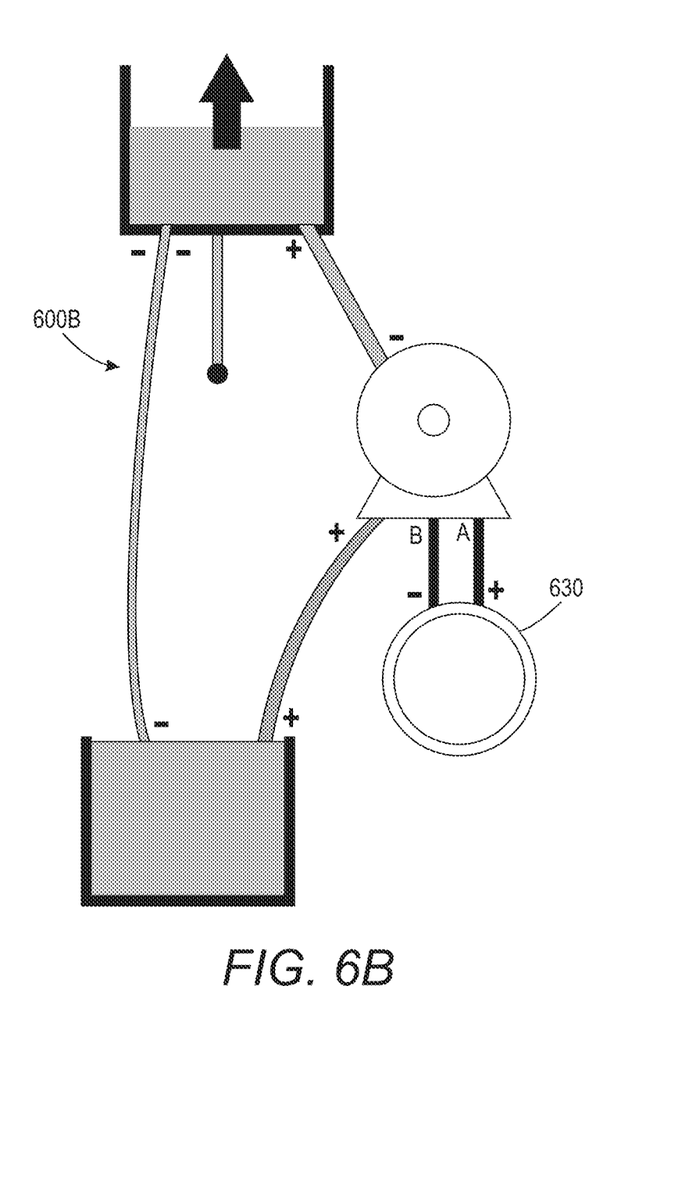
Figure 6C:
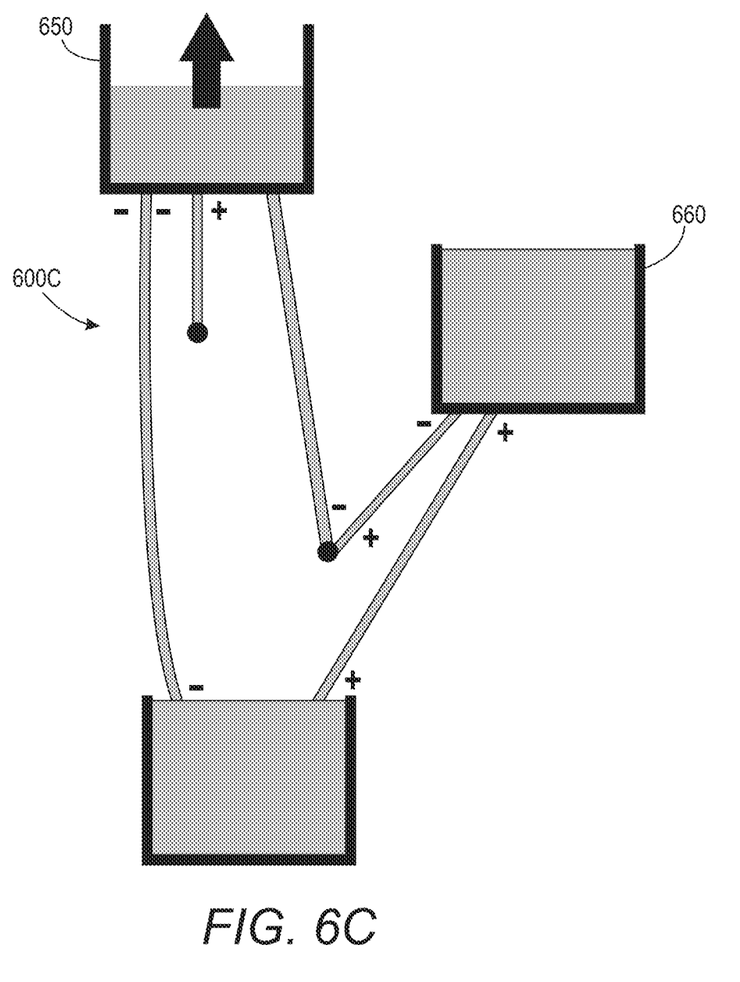
Figure 6D:
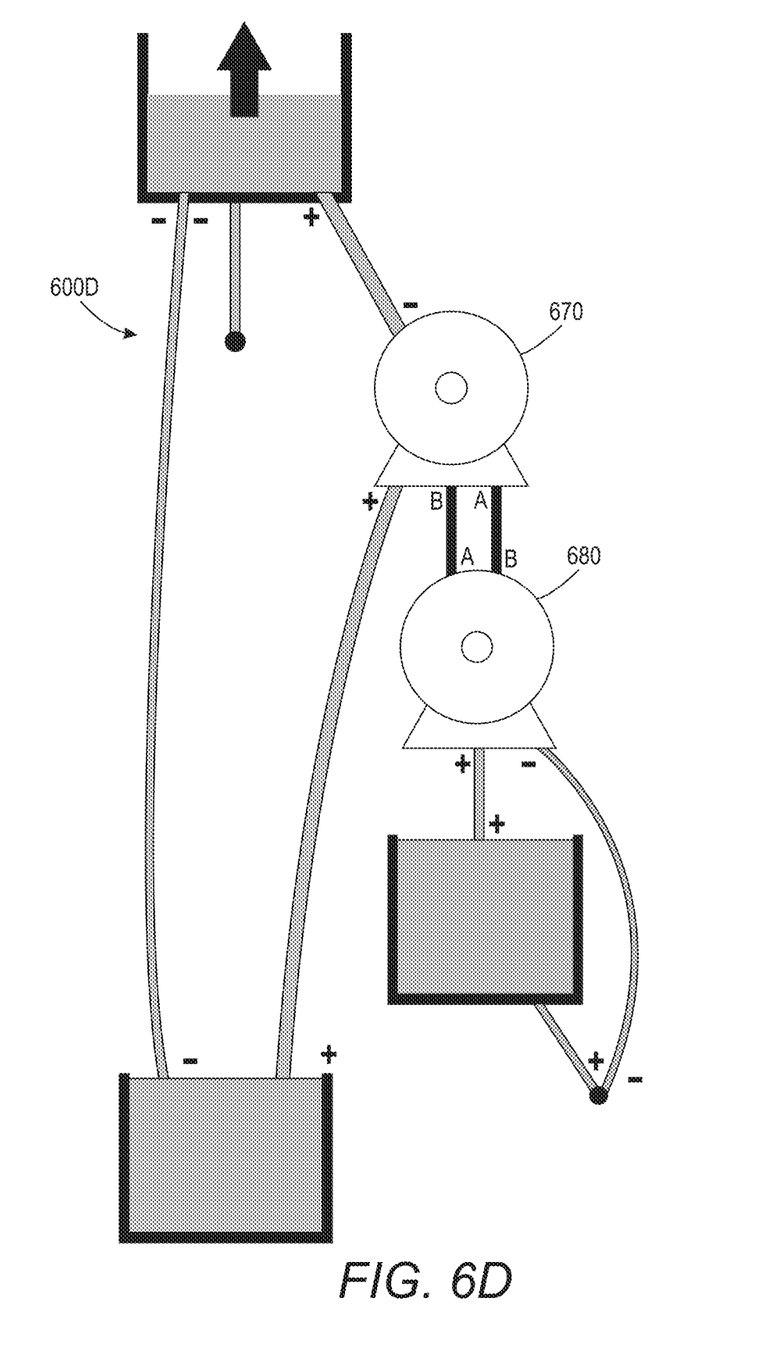

With reference to FIGS. 6A and 6B, the designs 600A, 600B include a spinning inertial disc (flywheel) 610 and a torque source powering a pump 630. In FIG. 6C, design 600C increases the water in the upper tank 650 by adding another tank 660 with a greater pressure. In FIG. 6D, the design 600D includes a water wheel 670 where falling water tank 690 is used to spin another wheel 680 that raises water.

The following will describe related work. Automated conceptual design approaches can be categorized by the types of domain knowledge utilized. The first set of approaches include those that use knowledge in addition to behavioral models to construct conceptual designs. These techniques can be divided into three groups [Chakrabarti et al., Computer-based design synthesis research: an overview. *Journal of Computing and Information Science in Engineering*, 11(2):021003, 2011]: (1) Function-based synthesis employ functional decompositions to describe design alternatives [Stone and Wood, Development of a functional basis for design. *Journal of Mechanical design*, 122(4):359-370, 2000] and hierarchically constrain the search space [Neema et al., Constraint-based design-space exploration and model synthesis. In *EMSOFT*, pages 290-305, 2003]. (2) Analogical design creates new conceptual designs by adapting existing designs organized with semantic knowledge in a library [Goel et al., On the benefits of digital libraries of case studies of analogical design: Documentation, access, analysis, and learning. *AI EDAM*, 29(2):215-227, 2015]. (3) Graph-grammar methods formulate the conceptual design problem as a set of grammar rules that specify how to change a graph representing the design [Kurtoglu et al., Automating the conceptual design process: "from black box to component selection". *AI EDAM*, 24(1):49-62 2010].

The second set of approaches use only behavioral models of the components to identify conceptual designs that match a particular behavior. These approaches typically take a optimization or other search methods. For example, genetic algorithms have been used to design analogue circuits that meet a behavioral specification [Grimbleby, Automatic analogue circuit synthesis using genetic algorithms. *IEE Proceedings-Circuits, Devices and Systems*, 147(6):319-323, 2000]. Another approach uses quantified satisfaction to design digital circuits [Feldman et al., Design space exploration as quantified satisfaction. arXiv preprint arXiv: 1905.02303, 2019].

In finality, the disclosed techniques have introduced an insane designer that enumerates designs using a library of component models. Each design is qualitatively verified by use of qualitative reasoning (e.g. envisionment) in the design scenario indicates that it may meet the requirements. Thus, contributions of the disclosed techniques include a procedure to automatically generate a scalable design space grammar that captures all possible designs, an efficient way of identifying feasible designs, systematic analyses of these methods, and an empirical evaluation with a case study of a design scenario for moving water uphill.

In addition to evaluating on additional design scenarios, some embodiments connect the insane designer to quantitative simulators (e.g., Modelica [Fritzson, Principles of Object-Oriented Modeling and Simulation with Modelica 2.1. Wiley-IEEE Press, Piscataway, NJ, 2004]) and use the qualitative model to guide quantitative parameter search for a set of components. Because qualitative simulation is exponential and it is used to evaluate designs, some embodiments explore new qualitative reasoning techniques that only expand trajectories that may reach the desired behavior. This includes expanding the design scenario with temporal logic [Vardi, From church and prior to psl. In 25 *years of model checking*, pages 150-171. Springer, 2008].

It will be further appreciated that the techniques disclosed herein may be embodied by a non-transitory storage medium storing instructions readable and executable by an electronic data processing device to perform the disclosed techniques. Such a non-transitory storage medium may comprise a hard drive or other magnetic storage medium, an optical disk or other optical storage medium, a cloud-based storage medium such as a RAID disk array, flash memory or other non-volatile electronic storage medium, or so forth. It will be further appreciated that the techniques disclosed herein may be embodied by one or more processors.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system comprising:
   at least one processor; and
   at least one memory including computer program code;
   the at least one memory and the computer program code configured to, with the at least one processor, cause the system to:
   construct a design space grammar using a library of components by considering all possible ways that each component in the library is able to connect to an interface;
   wherein the interface comprises a bounded set of connections that either are configured to connect to a component of the components, or are configured to connect to another interface, wherein the interface is a primary interface; and
   the at least one memory and the computer program code are further configured to, with the at least one processor, cause the system to:
   determine equations associated with a component of the components in the design space grammar;
   determine equations associated with each equivalence class of a dependent interface of the component; and
   solve equations associated with the design space grammar by:
   (i) combining the equations associated with the component of the components in the design space with the equations associated with each equivalence class of the dependent interface of the component;
   (ii) simplifying the combined equations by putting the combined equations in a standard form; and
   (iii) putting the simplified, combined equations into an equivalence class of the primary interface.

2. The system of claim 1, wherein the bound on the bounded set of connections is determined by a user.

3. The system of claim 1, wherein the interface further comprises a number of components that implement the interface.

4. A system comprising one or more processors configured to:
   build a design space grammar using a component model library, and a design scenario, wherein the design space grammar comprises a collection of design families that are used to implement the design scenario, and wherein each design family comprises at least one rule corresponding to a design alternative;
   wherein the collection of design families includes: (i) at least one design family with only one component, and (ii) at least one design family with more than one component; and
   wherein the one or more processors are further configured to:
   for each design family with only one component, enumerate each design alternative associated with the design family with only one component, extract equations of each design alternative associated with the design family with only one component, put the equations in standard form, and simplify coefficients of the equations; and
   group the equations into equivalence classes, and associate the equivalence classes with the design family with only one component.

5. The system of claim 4, wherein the one or more processors are further configured to:
   for each design family with two components, enumerate each design alternative associated with the design family with two components;
   for each design alternative associated with the family with two components, enumerate equivalence classes of a dependent design family;
   for each equivalence class of the dependent design family, combine equations of the equivalence class of the dependent design family with equations for the design alternative associated with the design family with two components, and simplify a result of the combination; and
   group the simplified result into second equivalence classes, and associate the second equivalence classes with the design family with two components.

6. The system of claim 4, wherein the one or more processors are further configured to:
   enumerate a sample design for each equivalence class in the design family used by the design scenario and evaluate at least one enumerated sample design in the design scenario using qualitative reasoning to determine whether the design scenario is satisfied.

7. The system of claim 6, wherein the one or more processors are further configured to:
   using the equivalence classes that satisfy the design scenario, identify potential base designs;
   delete a component from a potential base design of the potential base designs; and if the potential base design with the component deleted still satisfies the design scenario, discard, as spurious, the potential base design without the component deleted.

\* \* \* \* \*